United States Patent [19]

Roy et al.

[11] Patent Number: 4,675,302

[45] Date of Patent: Jun. 23, 1987

[54] LOW EXPANSION CERAMIC MATERIAL

[75] Inventors: Rustum Roy; Dinesh K. Agrawal; Ronnen A. Roy, all of State College, Pa.

[73] Assignee: The Perkin-Elmer Corporation, Norwalk, Conn.

[21] Appl. No.: 616,356

[22] Filed: Jun. 1, 1984

[51] Int. Cl.$^4$ ............................................. C04B 35/02
[52] U.S. Cl. .................................... 501/123; 501/94; 501/106; 501/132; 501/134; 501/135; 501/136; 501/154; 423/306; 423/472; 350/320
[58] Field of Search ................ 501/106, 94, 123, 132, 501/134, 135, 154; 429/193; 423/306; 428/472; 350/320

[56] References Cited

U.S. PATENT DOCUMENTS

| 4,049,891 | 9/1977 | Hong et al. .................... 429/193 |
| 4,105,456 | 8/1978 | Murakami et al. ............. 501/134 X |
| 4,217,855 | 8/1980 | Takagi ............................. 204/298 |
| 4,306,909 | 12/1981 | Oda et al. ....................... 501/132 X |
| 4,394,280 | 7/1983 | von Alpen et al. ............ 429/193 |
| 4,448,855 | 5/1984 | Senaha et al. ................. 350/320 |
| 4,495,300 | 1/1985 | Sano ................................ 501/102 |
| 4,587,172 | 5/1986 | Roy et al. ...................... 350/320 X |

FOREIGN PATENT DOCUMENTS 56-88875  7/1981  Japan .................... 501/135

OTHER PUBLICATIONS

Clearfield et al., Mat. Res. Bull., vol. 15, No. 11, pp. 1603-1610 (1980).
Hong, H. Y. P., "Materials Research Bulletin" vol. 11(2), pp. 173-182 (1976).
Boilot, J. P. et al., "Materials Research Bulletin" vol. 14(11), pp. 1469-1477 (1979).

Primary Examiner—William R. Dixon, Jr.
Assistant Examiner—Steven Capella
Attorney, Agent, or Firm—H. S. Ingham; F. L. Masselle; E. T. Grimes

[57] ABSTRACT

A low expansion ceramic composition is represented by the formula $Ca_{0.5}Ti_2P_3O_{12}$ in which up to 100 percent of the Ca is replaced by one or more of the other alkaline earth metals and alkali metals, the alkali metals being selected from the group consisting of Na, Li, K and combinations thereof and substituted in the ratio of two units of alkali metal for each unit of Ca replaced. Up to 100 percent of the Ti is replaced by one or more members selected from the group consisting of Zr, Sn, Nb, Ta and Cr. For each unit of Cr replacement an approximately equal unit of alkali metal is added. For each unit of Nb and/or Ta replacement an approximately equal unit of Na and/or K replaces a unit of Ca. Up to 100 percent of the P may be replaced by Si and/or S. The total of the amounts of Ca, other alkaline earth metals, Li, K, Ti, Sn, Nb, Ta and Cr is greater then zero. Preferably up to 100 percent of the Ca is replaced by Na, and up to 100 percent of the Ti is replaced by Zr or NaCr. The ceramic composition is especially suitable for optically reflecting films.

30 Claims, 2 Drawing Figures

LOW EXPANSION CERAMIC MATERIAL

This invention relates in general to controlled thermal expansion ceramic compositions and particularly to low expansion optical reflecting structures consisting of an optically reflecting film deposited on a ceramic substrate having nearly zero thermal coefficient of expansion.

BACKGROUND OF THE INVENTION

It is well known that almost every solid substance has a substantial, positive coefficient of thermal expansion, i.e., it expands significantly when heated. Up to the present time three families of crystalline ceramic materials have been found useful in the technology of low expanding ceramics: eucryptite-spodumene ($LiAlSiO_4$-$LiAlSi_2O_6$), the main constituent of cooking ware; cordierite ($Mg_2Al_4Si_5O_{18}$), the main component of steatite bodies; and zircon ($ZrSiO_4$), well known for use in refractories. However, most of these known ceramics still have some positive coefficient of thermal expansion.

Components of earth orbiting satellites and instruments used on such satellites are subjected to wide and sometimes sudden changes in temperature in outer space. This occurs as the satellite travels in and out of the direct sunlight and the earth's shadow, or while the satellite itself is spinning, or perhaps when a temperature control system malfunctions. Due to thermal expansion and contraction the sudden changes in temperatures can cause a component to distort or fracture resulting in its failure to carry out its function. This problem is also acute in the space environment for optical systems in the space environment, specifically for a reflecting film carried on a substrate, where any change can distort an image.

Some applications for mirrors operating even at room temperature are susceptible to distortions from even minute changes in temperature. For example, the demand for increased capacity of integrated circuit chips is pushing the capabilities of microphotolithographic projection devices that depend on mirror systems of extremely high precision.

Even electron beam microlithography instruments— which do not employ mirrors or other optical elements in the ordinary sense—have reached a stage of perfection where dimensional variation in structural components, e.g., the frame, due to even minute changes in ambient temperature, are a factor to be considered in its adverse impact on resolution capability of the apparatus.

One well-known approach to minimizing the problem with composite structures is to fabricate the composite with components having matching thermal expansion characteristics. However, this approach has been found not to succeed as well as desired in some cases of thin films on supporting substrates.

Ceramics of the type $NaZr_2P_3O_{12}$ have been utilized for electrical application involving ionic conductivity. Substitutions of elements are typically made to enhance this conductivity. For example, additional sodium has been substituted for some of the zirconium in a class of compounds, $Na_{1+4z}Zr_{2-z}P_3O_{12}$.

Similarly, silicon and sodium have been substituted jointly for a portion of the phosphorous to create a solid electrolyte which is used in batteries. Such silicon-containing compounds are described as $Na_{1+x}Si_xZr_2P_{3-x}O_{12}$. J. P. Boilot and J. P. Salantie, as reported in "Phase Transformation in $Na_{1+x}Si_xZr_2P_{3-x}O_{12}$ Compounds", Material Research Bulletin Vol. 14, pp. 1469–1477, 1979, studied phase transformation in the latter class of compounds, and compared this feature with thermal expansion for the range of compositions corresponding to x ranging from 3 down to 1. As x was decreased from 3 to 2 the thermal expansion coefficient was reported by Boilot, et al. to change inversely, viz., to increase to more than twice its value. At $x=1$ there was a substantial reversal to a negative thermal expansion coefficient. These changes, in this scientific study, were correlated to changes in crystal structure. In particular, there is a reversible change in crystal structure when the material is heated. Although Boilot et al. mentioned that the compound where $x=1$ displays an important shrinkage which could allow this material to be used when expansion is undesirable, he also recognized and pointed out the deleterious effect of a crystal structure that transforms upon heating.

Such effects are well known and generally avoided. For example, simple zirconium oxide ($ZrO_2$) changes its crystal structure upon heating and cooling, and fractures itself in the process. Thus zirconium oxide, which is used as a refractory in high temperature barrier applications, is virtually always stabilized by the addition of other elements to prevent the crystal change and the corresponding self-destruction that may occur during extreme thermal changes. Generally those skilled in the art will avoid using any ceramic that changes its crystal structure during temperature changes.

Studies on similar solid electrolytes were reported in H. Y. P. Hong, "Crystal Structures and Crystal Chemistry in the System $Na_{1+x}Zr_2Si_xP_{3-x}O_{12}$", Material Research Bulletin, Vol. 11, pp. 173–182, 1976. Values of x from 0 to 3 are included, as are several compounds in the z-series, but no information is provided on thermal expansion.

In view of the foregoing, a primary object of the present invention is to provide an improved process for producing materials having very low or nearly zero coefficient of thermal expansion.

Another object of the present invention is to provide a novel structural component having extremely high dimensional stability which does not distort or fracture in a temperature changing environment.

A further object of the present invention is to provide a novel ceramic substrate which supports an optically reflecting film, has nearly zero thermal expansion coefficient, and does not fracture from changes in crystal structure.

A still further object of this invention is to provide an improved optically reflecting component useful for precision telescopic and microlithography projection system.

BRIEF DESCRIPTION OF THE INVENTION

The foregoing and other objects of the present invention are achieved by providing a ceramic material having a chemical composition based on $Ca_{0.5}Ti_2P_3O_{12}$, wherein up to 100 percent of the Ca is replaced by one or more of the other alkaline earth metals and alkali metals, the alkali metals being selected from the group consisting of Na, Li, K and combinations thereof and substituted in the ratio of two units of alkali metal for each unit of Ca replaced. Up to 100 percent of the Ti is replaced by one or more members selected from the group consisting of Zr, Sn, Nb, Ta and Cr. For each unit of Cr replacement an approximately equal unit of alkali metal is added. For each unit of Nb and/or Ta replacement an approximately equal unit of Na and/or K replaces a unit of Ca. Up to 100 percent of the P may be replaced by Si and/or S. The total of the amounts of Ca, other alkaline earth metals, Li, K, Ti, Sn, Nb, Ta and Cr is greater then zero.

DETAILED DESCRIPTION OF THE INVENTION

Figure 1:
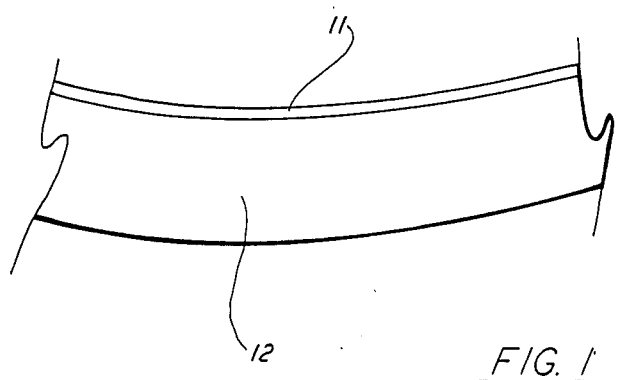
FIG. 1 shows a cross section of a ceramic substrate supporting an optical film.

As illustrated in FIG. 1, the optically reflecting structures of the present invention have a reflecting film 11 deposited on a ceramic substrate 12 formed of low expansion ceramic of the type $Ca_{0.5}Ti_2P_3O_{12}$, having certain atomic substitutions as described herein.

The alkaline earth ingredient Ca (calcium) may be present as set forth in the chemical formula $Ca_{0.5}Ti_2P_3O_{12}$ or may be all or partially replaced by one or more of the other alkaline earth metals Sr (strontium) and Ba (barium) and/or by at least one of the alkali metals Na (sodium), Li (lithium) and K (potassium). Preferably the substitution, if any, is made with Na. For each unit of Ca that is replaced by an alkali metal two units of alkali metal are substituted. As used herein and in the claims, a unit means that fraction of a mol of Ca that is replaced. As used herein "mol" broadly includes "atom" or "atomic"; for example, in the present context "mol percent" means "atomic percent".) Thus, for example, a unit of 0.25 Ca may be replaced by 0.5 Na as represented by the formula $Ca_{0.25}Na_{0.5}Ti_2P_3O_{12}$. Full substitution is represented by $NaTi_2P_3O_{12}$.

In a similar manner, the Ti (titanium) may be replaced by one or more of the metals having octahedrally coordinate atoms such as Zr (zirconium), Sn (tin), Nb (niobium), Ta (tantalum) and Cr (chromium). A preferable substitution, if any, is made with Zr. Substitutions for Ti are made on a one-to-one basis. For example, a 50 percent substitution of Zr yields $Ca_{0.5}ZrTiP_3O_{12}$. Full substitution provides $Ca_{0.5}Zr_2P_3O_{12}$.

Another desirable substitution for Ti is Cr which, however, should carry with it an approximately equal unit of alkali, preferably Na. Thus, for example, all or part of the Ti may be replaced by the combined pair of ingredients Na and Cr, set forth herein as NaCr. Full substitution yields $Ca_{0.5}Na_2Cr_2P_3O_{12}$. Preferably the Na and Cr are substituted together in equal mols or mol fractions, but the amounts of Na and Cr relative to each other may vary by up to 20 mol percent or more. As used herein and in the claims the representation "NaCr" includes such variants.

If the Ti is replaced by Nb and/or Ta, for each unit of such replacement an approximately equal unit of an alkali metal Li (lithium), Na or K should replace a unit of Ca. One resulting composition according to the present invention is $Na_{0.5}Ta_2P_3O_{12}$.

Multiple replacements may be made. For example, $Na_3Cr_2P_3O_{12}$ results from full replacement of the $Ca_{0.5}$ by Na and full replacement of the Ti by NaCr, i.e., Na$(NaCr)_2P_3O_{12}$. If, instead, half of the Ti is replaced by Zr and half by NaCr, the result is $Na_{1.5}Zr_{1.5}Cr_{0.5}P_3O_{12}$.

However, complete substitution of the Ca and Ti by Na and Zr, respectively, results in $NaZr_2P_3O_{12}$ which is not within the scope of the present invention. This composition often yields a two-phase structure susceptible to fracture due to different expansion characteristics of the two phases. Therefore, it is important that this type of complete substitution not be made. Thus the total of the Ca, other alkaline earth metals, Li, K, Ti, Sn, Nb, Ta and Cr present should be greater than zero, for example, greater than 10 mol percent of the total composition.

Although the element P (phosphorous) is a preferred constituent, as an alternative up to 100 percent of the P may be replaced by one or more of the other elements Si (silicon) and S (sulphur). Although these elements are in different groups in the periodic table there will be an appropriate charge compensation in the other sites of the structure and, therefore, the replacement is made on a one-to-one basis. An example is $Ca_{0.5}Ti_2Si_3O_{12}$.

The compositions of the present invention are a family of hexagonal crystal structures, which were discovered to have generally low thermal coefficients of expansion. Some of the ceramic compositions have very low coefficients, approaching zero in certain temperature ranges. Preferable compositions having such a characteristic are $Ca_{0.5}Zr_2P_3O_{12}$ (for 220° C. to 400° C.), $Na_{1.5}Zr_{1.5}Cr_{0.5}P_3O_{12}$ (for 75° C. to 150° C.) and $Na_3Cr_2P_3O_{12}$ (for 40° C. to 75° C.).

In the family of compositions are described by the formula $Ca_{0.5}Ti_2P_3O_{12}$ with certain optional substitutions, the subscripts represent mol fractions in the usual manner and are the preferable mol fractions. However, within the spirit of this invention small variations are permissible; for example as much as 10 percent of the Ca may be replaced by Ti or P. The basic hexagonal crystal structure should be maintained, and preferably the structure should be single phase.

The family provides a method of choosing thermal expansion properties in a controlled manner. As set forth in the examples and in FIG. 2 herein for certain compositions, test data for various substitutions can be obtained until a composition having desired characteristics in a specified temperature range is determined. Although very low coefficient is preferable for many circumstances, there may be certain applications requiring a low but finite amount of thermal expansion, for example where there are composites formed with other materials and where matching characteristics are desired.

A ceramic composition, in accordance with the invention, may be formed in any known or desired manner. A preferable method involves the known sol-gel technology. This is started with the preparation of aqueous solutions of soluble salts such as $Ca(NO_3)_2$, $Na_2CO_3$, $ZrO(NO_3)_2 \cdot xH_2O$ and $NH_4H_2PO_4$. The solutions are mixed in appropriate stoichiometric quantities, pH and temperature adjusted to form gels which are dried at 100° C. and then calcined at 600° C. for 16 hours.

A second method of preparation consists of using stoichiometric mixtures of oxide powders, e.g. $Na_2CO_3$, $CaCO_3$, $Cr_2O_3$, $ZrO_2$, $TiO_2$ and $NH_4H_2PO_4$, which are homogenized by hand mixing in acetone and grinding and then air drying. The dry powders are heated at 200° C. for 15 hours, 600° C. for 4 hours, and finally calcined at 900° C. for 15 hours to remove volatiles such as $H_2O$, $CO_2$ and $NH_3$. The calcines are ground, pressed into 2.5 cm pellets at a pressure of 333 bar and fired at 1000° C. for 15 hours and 1200° C. for 24 hours.

In further detail, the powdered raw materials are mixed together in desired proportions. After rough mixing, the mixture is ground to produce a fine, uniform powder. While any suitable grinding method may be used, ball milling is preferred for convenience and reliability. Preferably, an anti-coagulation agent, such as acetone, is included to prevent coagulation and gelification of the very fine powders used as raw materials. Any suitable mix of grinding balls, powder mixture and anti-coagulant may be used, such as (by volume) ⅓ powder mixture, ⅓ grinding balls and ⅓ acetone. After grinding for an appropriate period, usually for at least about 12 hours, the resulting slurry is removed, dried and the soft agglomerantes produced are forced through a fine mesh screen to homogenize the particle size.

The material is then formed into the desired article shape. Typically, the material may be formed in a hydraulic press at about 666 to 3333 bar. If desired, an organic binder, such as 1 to 2 percent of a 15 percent aqueous polyvinyl alcohol solution may be used to improve pressing uniformity. The binder is evaporated or burned off early in the sintering heating cycle. Other processes, such as slip casting or hot-pressing, will often be preferred in production operations for faster throughput and lower shrinkage. The resulting self-sustaining pressed structure is sintered to produce the desired polycrystalline ceramic. The structure may be sintered at a suitable temperature for a suitable time period. Generally, sintering temperatures of about 1100° C. are preferred for optimum density. Typically, the structure may be sintered in a Lindberg box-type furnace heated with silicon carbide elements. Disc shaped structures may be supported on zirconia setters and covered with alumina dishes to prevent contamination.

The structures are cooled from the sintering temperature to room temperature over a reasonable time period to avoid thermal shocks. Simply turning the furnace off and allowing it to cool naturally is generally satisfactory and convenient.

In applying the concept of the present invention to optical components, e.g., curved mirrors, a substrate having the desired optical configuration is formed as described above. Then, at least the optically active surface is provided with a reflective coating. Typically, the coating is a metal; aluminum is probably the most common, but silver, gold or any other suitable metal may be employed. Multilayer dielectric coatings are also used.

To avoid tarnishment or oxidation, metallic reflective coatings require a superposed protective layer of quartz, magnesium fluoride or other appropriate material. Both the reflective and protective coatings usually are extremely thin. In one particular embodiment, a primary mirror for a telescope, an aluminum reflective layer and a magnesium flouride over-coating have an aggregate thickness of about 1100 Angstroms. The thickness required depends on various factors, primarily on the coating material used and the wavelength of radiation to be reflected. For purposes of comparison, an aluminum coating for use in the visible range of the spectrum may need to be approximately twice as thick as for operation in the ultraviolet range of wavelengths.

The particular technique for applying the coating is not of the essence of the invention. Vacuum deposition is a well known and commonly employed method. A useful coating method is described in U.S. Pat. No. 4,217,855. For further information, general or particular, reference may be had to *Vacuum Depositions of Thin Films,* L. Holland, John Wiley & Sons, 1956.

Coefficient of thermal expansion is measured with standard well-known techniques. One such technique utilizes a dilatometer whereby a sample is heated while changes in length are measured by observation through a telescope device.

The ceramic compositions of the present invention are suitable for any application requiring low or nearly zero thermal expansion properties, such as for optical elements as described herein, for special purpose structural components in environments where dimensional stability is critical, as well as for more common place uses such as ceramic cooking ware, crucibles and the like.

EXAMPLE 1

Figure 2:
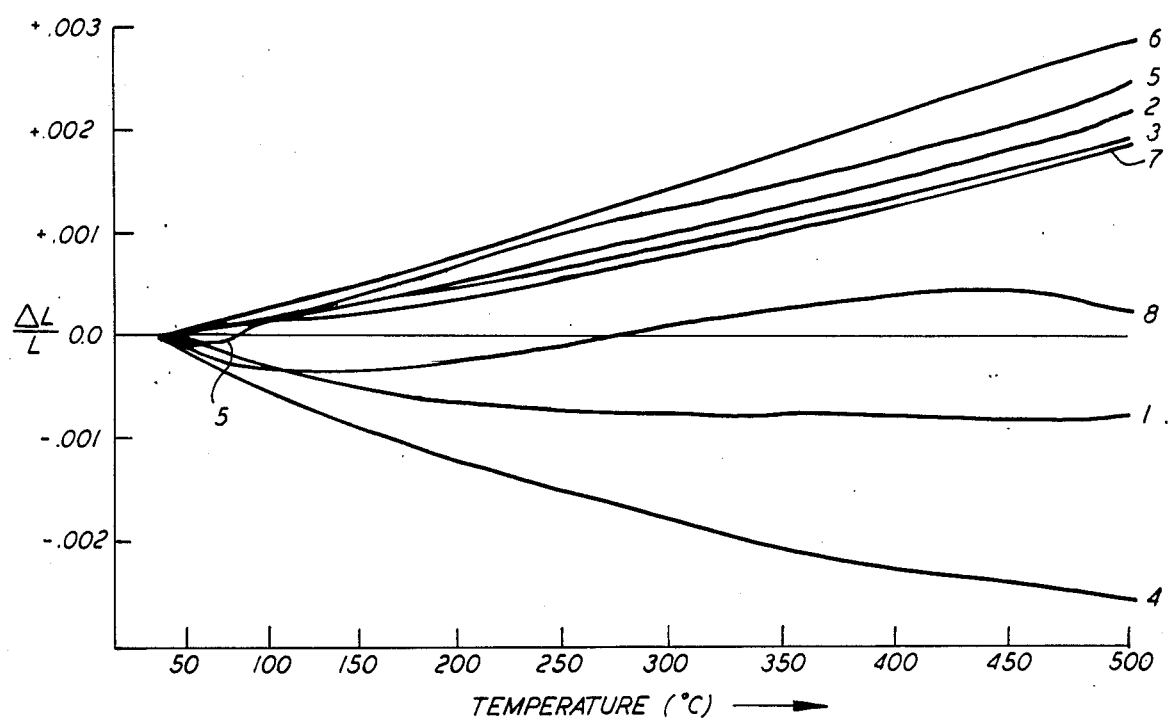
FIG. 2 shows plots of measurements of thermal expansion versus temperature for certain compositions of the present invention.

A sample of composition with molecular formula $Ca_{0.5}Zr_2P_3O_{12}$ was synthesized by solid state reaction technique using oxide powders as precursors. A stoichiometric mixture of $CaCO_3$, $ZrO_2$ and $NH_4H_2PO_4$ (ADP) was homogenized in acetone by hand mixing in a morter or ball milling, and then let dry in air to remove acetone. The dry mixture was calcined slowly at 200° C. for 16 hours, 600° C. for 4 hours and finally 900° C. for 16 hours to remove volatiles such as $H_2O$, $NH_3$ and $CO_2$. After calcination, the mixture, containing only oxides was ground into fine powder ($-35$ mesh) and cold pressed into 2.5 cm diameter pellets (pressure 666 bars) in order to prepare sintered ceramic compact samples. The pellets were fired at 1000° C. for 16 hours and 1200° C. for 2 days. Bulk thermal expansion measurements were made on a rectangular bar ($\sim 2 \times 0.5 \times 0.5$ cm$^3$) using a Harrop Dilatometer with fused silica as standard. The obtained thermal expansion versus temperature profile is shown in FIG. 2, which indicates a low negative coefficient of thermal expansion of $-1.6 \times 10^{-6}/°$ C. in temperature range of 25°–500° C.

EXAMPLE 2

The following compositions in the Table were prepared and tested using techniques similar to those given in Example 1:

Table

| Composition | Coefficient of Thermal Expansion $10^{-6}/°$ C. (25° C.–500° C.) |
| --- | --- |
| 1. $Ca_{0.5}Zr_2P_3O_{12}$ (Example 1) | $-1.6$ |
| 2. $Ca_{0.5}Ti_2P_3O_{12}$ | $+5.1$ |
| 3. $Ca_{0.5}ZrTiP_3O_{12}$ | $+4.35$ |
| 4. $NaTi_2P_3O_{12}$ | $-5.5$ |
| 5. $Na_3Cr_2P_3O_{12}$ | $+5.3$ |
| 6. $Ca_{0.25}Na_{0.5}Zr_2P_3O_{12}$ | $+6.3$ |
| 7. $Ca_{0.25}Na_{0.5}Ti_2P_3O_{12}$ | $+4.0$ |
| 8. $Na_{1.5}Zr_{1.5}Cr_{0.5}P_3O_{12}$ | $+0.5$ |

The thermal expansion versus temperature profiles for these compositions are all presented in FIG. 2, numbered as in the Table.

While the invention has been described above in detail with references to specific embodiments, various changes and modifications which fall within the spirit of the invention and scope of the appended claims will become apparent to those skilled in this art. The invention is therefore only intended to be limited by the appended claims or their equivalents.

What is claimed is:

1. A ceramic material characterized by low coefficient of thermal expansion and having a composition based on the formula $Ca_{0.5}Ti_2P_3O_{12}$, wherein:
   up to 100 percent of the Ca is replaced by one or more of the other alkaline earth metals and Na, the Na being substituted in the ratio of two units of Na for each unit of Ca replaced;
   up to 100 percent of the Ti is replaced by one or more members selected from the group consisting of Zr, Sn, Nb, Ta and Cr;
   up to 100 percent of the P is replaced by one or more elements selected from the group consisting of Si and S;
   for each unit of Cr replacement an approximately equal unit of alkali metal is added;
   for each unit of Nb and Ta replacement an approximately equal unit of Ca is replaced by a unit of alkali metal; and
   the total of the amounts of Ca, other alkaline earth metals, Ti, Sn, Nb, Ta and Cr is greater then zero.

2. A ceramic material characterized by low coefficient of thermal expansion and having a composition based on the formula $Ca_{0.5}Ti_2P_3O_{12}$, wherein:
   up to 100 percent of the Ca is replaced by one or more of the other alkaline earth metals and Na, the Na being thereof and substituted in the ratio of two units of Na for each unit of Ca replaced;
   up to 100 percent of the Ti is replaced by one or more members selected from the group consisting of Zr, Sn, Nb, Ta and Cr;
   for each unit of Cr replacement an approximately equal unit of alkali metal is added;
   for each unit of Nb and Ta replacement an approximately equal unit of Ca is replaced by a unit of alkali metal; and
   the total of the amounts of Ca, other alkaline earth metals, Ti, Sn, Nb, Ta and Cr is greater then zero.

3. A ceramic material according to claim 2, wherein the total of the amounts of Ca, other alkaline earth metals, Ti, Sn, Nb, Ta and Cr is greater than 10 atomic percent of the composition.

4. A ceramic material according to claim 2, wherein:
   up to 100 percent of the Ca is replaced by Na in the ratio of two units of Na for each unit of Ca replaced;
   up to 100 percent of the Ti is replaced by a member selected from the group consisting of Zr, NaCr, and combinations thereof; and
   the total of the Ca, Ti and NaCr is greater than zero.

5. A ceramic material according to claim 4, wherein the total of the Ca, Ti and NaCr is greater than 10 atomic percent of the composition.

6. The ceramic material of claim 2 having substantially the composition $Ca_{0.5}Zr_2P_3O_{12}$.

7. The ceramic material of claim 2 having substantially the composition $Na_{1.5}Zr_{1.5}Cr_{0.5}P_3O_{12}$.

8. The ceramic material of claim 2 having substantially the composition $Na_3Cr_2P_3O_{12}$.

9. A ceramic material selected from the group consisting of $Ca_{0.5}Zr_2P_3O_{12}$, $Na_{1.5}Zr_{1.5}Cr_{0.5}P_3O_{12}$ and $Na_3Cr_2P_3O_{12}$.

10. A ceramic substrate for an optical reflector characterized by resistance to distortion and fracture under variations in temperature, having a composition based on $Ca_{0.5}Ti_2P_3O_{12}$, wherein:
    up to 100 percent of the Ca is replaced by Na in the ratio of two units of Na for each unit of Ca replaced;
    up to 100 percent of the Ti is replaced by a member selected from the group consisting of Zr, NaCr, and combinations thereof; and
    the total of the Ca, Ti and NaCr is greater than zero.

11. A substrate according to claim 10 wherein the total of the Ca, Ti and NaCr is greater than 10 atomic percent of the composition.

12. A substrate according to claim 10 wherein the low expansion ceramic material has substantially the composition $Ca_{0.5}Zr_2P_3O_{12}$.

13. A substrate according to claim 10 wherein the low expansion ceramic material has substantially the composition $Na_{1.5}Zr_{1.5}Cr_{0.5}P_3O_{12}$.

14. A substrate according to claim 10 wherein the low expansion ceramic material has substantially the composition $Na_3Cr_2P_3O_{12}$.

15. A method of supporting an optically reflecting film so as to resist distortion and fracture under variations in temperature, which comprises providing a substrate for the optically reflecting film, the substrate being a low expansion ceramic material having a composition based on the formula $Ca_{0.5}Ti_2P_3O_{12}$, wherein:
    up to 100 percent of the Ca is replaced by one or more other alkaline earth metals or Na, the Na being thereof and substituted in the ratio of two units of Na for each unit of Ca replaced;
    up to 100 percent of the Ti is replaced by one or more members selected from the group consisting of Zr, Sn, Nb, Ta and Cr;
    up to 100 percent of the P is replaced by one or more elements selected from the group consisting of Si and S;
    for each unit of Cr replacement an approximately equal unit of alkali metal is added;
    for each unit of Nb and Ta replacement an approximately equal unit of Ca is replaced by a unit of alkali metal; and
    the total of the amounts of Ca, other alkaline earth metals, Ti, Sn, Nb, Ta and Cr is greater then zero.

16. A method of supporting an optically reflecting film so as to resist distortion and fracture under variations in temperature, which comprises providing a substrate for the optically reflecting film, the substrate being a low expansion ceramic material having a composition based on the formula $Ca_{0.5}Ti_2P_3O_{12}$, wherein:
    up to 100 percent of the Ca is replaced by one or more other alkaline earth metals or Na, the Na being thereof and substituted in the ratio of two units of Na for each unit of Ca replaced;
    up to 100 percent of the Ti is replaced by one or more other of members selected from the group consisting of Zr, Sn, Nb, Ta and Cr;
    for each unit of Cr replacement an approximately equal unit of alkali metal is added;
    for each unit of Nb and Ta replacement an approximately equal unit of Ca is replaced by a unit of alkali metal; and
    the total of the amounts of Ca, other alkaline earth metals, Ti, Sn, Nb, Ta and Cr is greater then zero.

17. A method according to claim 16 wherein:
    up to 100 percent of the Ca is replaced by Na in the ratio of two units of Na for each unit for Ca replaced;

up to 100 percent of the Ti is replaced by a member selected from the group consisting of Zr, NaCr, and combinations thereof; and the total of the Ca, Ti and NaCr is greater than zero.

18. A method according to claim 17 wherein the low expansion ceramic material has substantially the composition $Ca_{0.5}Zr_2P_3O_{12}$.

19. A method according to claim 17 wherein the low expansion ceramic material has substantially the composition $Na_{1.5}Zr_{1.5}Cr_{0.5}P_3O_{12}$.

20. A method according to claim 17 wherein the low expansion ceramic material has substantially the composition $Na_3Cr_2P_3O_{12}$.

21. A method of manufacturing a low expansion ceramic material comprising:

forming a body of the desired configuration of a composition of ceramic precursor ingredients represented by a molecular formula $Ca_{0.5}Ti_2P_3O_{12}$, wherein:

up to 100 percent of the Ca is replaced by one or more of the other alkaline earth metals and Na, the Na being substituted in the ratio of two units of Na for each unit of Ca replaced;

up to 100 percent of the Ti is replaced by one or more members selected from the group consisting of Zr, Sn, Nb, Ta and Cr;

up to 100 percent of the P is replaced by one or more elements selected from the group consisting of Si and S; and for each unit of Cr replacement an approximately equal unit of alkali metal is added;

for each unit of Nb and Ta replacement an approximately equal unit of Ca is replaced by a unit of alkali metal; and the total of the amounts of Ca, other alkaline earth metals, Ti, Sn, Nb, Ta and Cr is greater than zero;

heating the body under conditions of time and temperature effective to sinter the body; and cooling the body.

22. A method of manufacturing a low expansion ceramic material comprising:

forming a body of the desired configuration of a composition of ceramic precursor ingredients represented by a molecular formula $Ca_{0.5}Ti_2P_3O_{12}$, wherein:

up to 100 percent of the Ca is replaced by one or more other alkaline earth metals or Na the Na being K and substituted in the ratio of two units of alkali metal for each unit of Ca replaced;

up to 100 percent of the Ti is replaced by one or more members selected from the group consisting of Zr, Sn, Nb, Ta Cr;

for each unit of Cr replacement an approximately equal unit of Na is added; and for each unit of Nb and Ta replacement an approximately equal unit of Ca is replaced by a unit of alkali metal; and the total of the amounts of Ca, other alkaline earth metals, Ti, Sn, Nb, Ta and Cr is greater than zero;

heating the body under conditions of time and temperature effective to sinter the body; and cooling the body.

23. A method according to claim 22 wherein:

up to 100 percent of the Ca is replaced by Na in the ratio of two to one; and up to 100 percent of the Ti is replaced by a member selected from the group consisting of Zr, NaCr, and combinations thereof.

24. A method according to claim 22 wherein the molecular formula is substantially $Ca_{0.5}Zr_2P_3O_{12}$.

25. A method according to claim 22 wherein the molecular formula is substantially $Na_{1.5}Zr_{1.5}Cr_{0.5}P_3O_{12}$.

26. A method according to claim 22 wherein the molecular formula is substantially $Na_3Cr_2P_3O_{12}$.

27. A method according to claim 22, wherein the conditions of time and temperature are effective to impart to the body a single phase crystal structure.

28. A structural element characterized by high dimensional stability under even extreme temperature variations fabricated of a ceramic material comprising the heat reaction product, fired to ceramic maturity, of a composition represented by the molecular formula $Ca_{0.5}Ti_2P_3O_{12}$, wherein:

up to 100 percent of the Ca is replaced by one or more of the other alkaline earth metals and Na, the Na being thereof and substituted in the ratio of two units of Na for each unit of Ca replaced;

up to 100 percent of the Ti is replaced by one or more members selected from the group consisting of Zr, Sn, Nb, Ta and Cr;

up to 100 percent of the P is replaced by one or more elements selected from the group consisting of Si and S;

for each unit of Cr replacement an approximately equal unit of Na is added; and for each unit of Nb and Ta replacement an approximately equal unit of Ca is replaced by a unit of alkali metal;

the total of the amounts of Ca, other alkaline earth metals, Ti, Sn, Nb, Ta and Cr is greater then zero.

29. A structural element characterized by high dimensional stability under even extreme temperature variations fabricated of a ceramic material comprising the heat reaction product, fired to ceramic maturity, of a composition represented by the molecular formula $Ca_{0.5}Ti_2P_3O_{12}$, wherein:

up to 100 percent of the Ca is replaced by one or more of the other alkaline earth metals and Na, the Na being thereof and substituted in the ratio of two units of Na for each unit of Ca replaced;

up to 100 percent of the Ti is replaced by one or more members selected from the group consisting of Zr, Sn, Nb, Ta and Cr;

for each unit of Cr replacement an approximately equal unit of alkali metal is added;

for each unit of Nb and Ta replacement an approximately equal unit of Ca is replaced by a unit of alkali metal; and the total of the amounts of Ca, other alkaline earth metals, Ti, Sn, Nb, Ta and Cr is greater then zero.

30. A structural element according to claim 29 wherein:

up to 100 percent of the Ca is replaced by Na in the ratio of two units of Na for each unit of Ca replaced;

up to 100 percent of the Ti is replaced by a member selected from the group consisting of Zr, NaCr, and combinations thereof; and the total of the Ca, Ti and NaCr is greater than zero.

* * * * *